United States Patent [19]

Gulas

[11] 4,023,786
[45] May 17, 1977

[54] REFRACTORY LINING FOR A PIG IRON CONTAINER

[75] Inventor: Hans-Jurgen Gulas, Leoben, Austria

[73] Assignee: Veitscher Magnesitwerke-Actien-Gesellschaft, Vienna, Austria

[22] Filed: Sept. 24, 1976

[21] Appl. No.: 726,064

[30] Foreign Application Priority Data

Oct. 8, 1975 Austria .............................. 7707/75

[52] U.S. Cl. ............................................. 266/280
[51] Int. Cl.² .......................................... C21C 5/44
[58] Field of Search ............................ 266/280, 284

[56] References Cited

UNITED STATES PATENTS 2,068,641  1/1937  Carrie ................................ 266/284

*Primary Examiner*—Gerald A. Dost
*Attorney, Agent, or Firm*—Kurt Kelman

[57] ABSTRACT

A refractory lining for a vessel holding pig iron comprises magnesite-chromite bricks containing from 15–30%, by weight, of chromic oxide. The chromite is so highly dissolved in the brick mass that it has no more than a 12%, by volume, residue of chromite.

3 Claims, No Drawings

REFRACTORY LINING FOR A PIG IRON CONTAINER

The present invention relates to an improved refractory lining for a stationary or movable vessel for holding pig iron.

Stationary mixers or movable ladles are used as vessels for holding pig iron between the blast furnace and steel melting apparatus in steel plants. These intermediate vessels serve, for instance, for the transport of the pig iron, to obtain a uniform pig iron composition, to receive and store excess amounts of pig iron which is not being used immediately, and to keep the pig iron at an elevated temperature.

The lining of such vessels usually consists of magnesite, dolomite or high-alumina bricks. Since the operating temperatures in these vessels conventionally did not exceed 1400° C, the wear of the lining depended primarily on erosion by the slag. The slag comprises primarily $CaO+SiO_2$ (usually more than 60%, by weight, of the slag), the weight ratio of $CaO/SiO_2$ being about 0.6 – 1.4, and a substantial amount (up to 15%, by weight) of an alkali metal oxide.

Magnesite bricks usually perform well in linings for stationary mixers while dolomite bricks are preferred for transport ladle linings. High-alumina bricks are readily eroded by slags with higher CaO and alkali metal oxide contents. Therefore, they are not used much.

Ever higher tapping temperatures for the pig iron have been encountered during the development of more efficient blast furnaces with ever larger diameters. As a consequence, the temperatures in the intermediate vessels holding the pig iron have increased above 1400° C. This has reduced the life of the magnesia brick linings usually consisting of sintered magnesia rich in iron in such pig iron containers and, in some instances, their life has been reduced to half the time they lasted before the introduction of the large blast furnaces. The obvious improvement in the heat resistance of such bricks by the use of high-quality sintered magnesia poor in iron has proved to be unsatisfactory in practice.

It is the primary object of this invention to provide longer lasting bricks for refractory linings of vessels for holding pig iron at operating temperatures above 1400° C.

This and other objects are accomplished in accordance with the invention with bricks of a magnesite-chromite mass containing from 15–30%, preferably 20–25%, by weight, of chromic oxide ($Cr_2O_3$), the chromite contained in the brick mass being so highly dissolved therein that the brick mass has no more than a 12%, preferably 5%, by volume residue of chromite.

The improved life of such magnesite-chromite refractory bricks is unexpected since chromite per se is strongly eroded by the alkali metal oxides in the slag. However, such erosion is effectively reduced when the chromite is dissolved to the high degree indicated during the burning of the periclase starting material to produce the brick mass, the chromite being present after cooling of the burnt mass essentially only in the form of newly formed chromite spinels. These bricks also are more resistant to erosion by acid slags.

The high degree of solution of the chromite in the brick mass can be obtained by melting chromium ore and a magnesia carrier together. The solidified melt is then comminuted and shaped into bricks.

Another method of preparing the bricks of the present invention comprises sintering together chromium ore and a magnesia carrier, such as magnesite ore, caustically burnt magnesia or sintered magnesia, without melting them, as has been described, for example, in Austrian Pat. No. 301,433. In this case, the chromite grains are dissolved in the periclase mass in the form of a solid solution during burning at high temperatures, for example in the range above 2000° or 2100° C. When the burnt mass is cooled, the newly formed chromite spinels are precipitated. This sinter material is then shaped into refractory bricks.

It is also possible to avoid either melting or sintering the chromium ore and magnesia carrier together, and to obtain the solution of the chromite in the mass by burning the bricks, for example at a temperature of 1700° to 1900° C, provided that the chromium ore and a part of the sinter magnesia (for example up to 10%, by weight) is present in the mass in very finely comminuted form, i.e. a grain size below 0.1 mm, at least about 70%, by weight, of these fine grain sizes being below 0.06 mm. An improved resistance to temperature changes will be obtained if a minor part of the chromium ore (for example 10–40%, by weight) has a larger grain size in the range of 0.5 to 5 mm, preferably 0.7 to 2 mm. The coarse portion of the chromium ore is not considered in determining the chromite residue which is the microscopically determinable residue of the original chromium ore grains. In this method of preparing the mass for the refractory bricks of this invention, it is advantageous to use 26–56%, by weight, of chromium ore in the brick mass. If the chromium ore has a $Cr_2O_3$ content of 45–57%, by weight, which is a preferred type of chromium ore, for all methods of preparation, the resultant $Cr_2O_3$ content in the brick mass will be about 15–25%, by weight.

The following example will illustrate the invention:

A magnesia-chromium sinter material was produced by sintering together at a temperature of 2150° C 41%, by weight, of chromium ore and 59%, by weight, of caustically burnt magnesia. The raw materials and the sinter material had the following composition (calculated free of loss of ignition):

|  |  | Magnesia | Chromium Ore | Sinter |
|---|---|---|---|---|
| $SiO_2$ | %, by weight | 0.48 | 1.42 | 0.82 |
| $Al_2O_3$ | " | 0.30 | 14.73 | 6.46 |
| $Fe_2O_3$ | " | 5.30 | 28.00 | 14.89 |
| $Cr_2O_3$ | " | — | 46.49 | 20.47 |
| CaO | " | 2.89 | 0.06 | 1.91 |
| MgO | (by difference) | 91.03 | 9.30 | 55.45 |

The sinter material was ground into a brick mass with the following grain size distribution:
3–5 mm: 25%, by weight
1–3 mm: 35%, by weight
0.1–1 mm: 20%, by weight
up to 0.1 mm: 30%, by weight The brick mass was mixed with about 4%, by weight, of a magnesium sulfate solution and was pressed into bricks at a molding pressure of 1250 kp/cm². The bricks were dried and then burned at 1800° C for four hours in a tunnel furnace (brick quality A). During the manufacture, the chromium ore components were completely dissolved in the periclase. The completed bricks contained no residue of chromite.

Another brick type (brick quality B) was produced in the same manner from sinter magnesia and a chromium ore of the following compositions:

|  |  | Sinter Magnesia | Chromium Ore |
|---|---|---|---|
| $SiO_2$ | %, by weight | 0.32 | 2.80 |
| $Al_2O_3$ | " | 0.38 | 13.42 |
| $Fe_2O_3$ | " | 6.32 | 15.17 |
| CaO | " | 1.85 | 0.28 |
| $Cr_2O_3$ | " | — | 52.82 |
| MgO | (by difference) | 91.13 | 15.51 |

The raw materials had the following grain size distribution:

| Sinter magnesia: | 1 – 3 mm: | 35%, | by weight |
|---|---|---|---|
|  | 0.1 – 1 mm: | 20%, | " |
|  | up to 0.1 mm: | 5%, | " |
| Chromium ore: | 0.1 – 0.7 mm: | 10%, | " |
|  | up to 0.1 mm: | 30%, | " |

After burning, the completed bricks had a residue of 4%, by volume, of chromite.

Bricks of quality A and B were used for the refractory lining of rotary furnace containing pig iron and slag and, under identical operating conditions, they were compared with a refractory lining of conventional bricks used in such furnaces (brick quality C) and which had the following composition:

|  |  | Brick Quality C |
|---|---|---|
| $SiO_2$ | %, by weight | 0.38 |
| $Al_2O_3$ | " | 0.42 |
| $Fe_2O_3$ | " | 6.48 |
| CaO | " | 1.76 |
| MgO | (by difference) | 90.96 |

A slag of the following composition was contained in the furnace:

| $SiO_2$ | %, by weight | 39.7 |
|---|---|---|
| $Fe_2O_3$ | " | 12.9 |
| $Al_2O_3$ | " | 3.1 |
| CaO | " | 31.8 |
| MgO | (by difference) | 2.4 |
| MnO |  | 4.0 |
| alkali metals |  | 6.1 |

The furnace was heated to a temperature of 1440° C and this temperature was maintained for 3 hours and 20 minutes while the furnace was rotated at 20 rpm. After cooling and removal of the test bricks from the furnace lining, qualities A and B showed an erosion of 0.3 and 0.4 mm, respectively, while 9 mm were eroded from the bricks of quality C.

In a 1500-ton mixer lined with bricks of quality C, a test region in the region of greatest wear of the lining was built into the lining, half the test region consisting of bricks of quality A and half of the test region consisting of bricks of quality B. After a throughput of about 520,000 tons of pig iron, test bricks A and B projected from bricks C by about 50 mm.

The above mixer lined entirely with bricks of quality A reached a throughput of 1,150,000 tons of pig iron. This compared with an average throughput of about 650,000 tons in the mixer lined with bricks C.

What is claimed is:
1. A refractory lining of a vessel for holding pig iron, comprising bricks of a magnesite-chromite mass containing from 15–30%, by weight, of chromic oxide, the chromite contained in the brick mass being so highly dissolved therein that the brick mass has no more than a 12%, by volume, residue of chromite.
2. The refractory lining of claim 1, wherein the bricks contain from 20–25%, by weight, of chromic oxide.
3. The refractory lining of claim 1, wherein the brick mass has no more than 5%, by volume, residue of chromite.

* * * * *